(12) United States Patent
Boucher

(10) Patent No.: US 7,506,329 B1
(45) Date of Patent: Mar. 17, 2009

(54) METHOD AND SYSTEM FOR TARGETING PROFILE GATHERING THROUGH REAL-TIME DATA

(75) Inventor: Michael L. Boucher, Lafayette, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 930 days.

(21) Appl. No.: 10/838,086

(22) Filed: May 4, 2004

(51) Int. Cl.
*G06F 9/45* (2006.01)
(52) U.S. Cl. ..................................... 717/151
(58) Field of Classification Search ......... 717/127–133, 717/151–158
See application file for complete search history.

(56) References Cited

U.S. PATENT DOCUMENTS

| | | | | |
|---|---|---|---|---|
| 5,355,487 | A * | 10/1994 | Keller et al. | 717/127 |
| 6,170,083 | B1 * | 1/2001 | Adl-Tabatabai | 717/158 |
| 6,314,558 | B1 * | 11/2001 | Angel et al. | 717/118 |
| 6,341,371 | B1 * | 1/2002 | Tandri | 717/158 |
| 6,401,182 | B1 * | 6/2002 | Sweeney | 711/171 |
| 6,549,930 | B1 * | 4/2003 | Chrysos et al. | 718/104 |
| 6,751,789 | B1 * | 6/2004 | Berry et al. | 717/130 |
| 6,971,091 | B1 * | 11/2005 | Arnold et al. | 717/145 |
| 7,039,910 | B2 * | 5/2006 | Kosche et al. | 717/158 |
| 7,293,259 | B1 * | 11/2007 | Dmitriev | 717/130 |
| 2004/0019886 | A1 * | 1/2004 | Berent et al. | 717/158 |
| 2004/0103408 | A1 * | 5/2004 | Chilimbi et al. | 717/140 |
| 2005/0034105 | A1 * | 2/2005 | Hind et al. | 717/130 |
| 2005/0138623 | A1 * | 6/2005 | Fresko | 717/124 |
| 2005/0172079 | A1 * | 8/2005 | McFarling | 711/133 |

OTHER PUBLICATIONS

Arnold et al., "Adaptive Optimization in the Jalapeno JVM", OOPSLA '00, Oct. 2000 Minneapolis, MN, USA, 2000, ACM, pp. 47-65.*
Alpern et al., "The Jalapeno Virtual Machine", IBM Systems Journal, vol. 39, No. 1, 2000, pp. 211-238.*

* cited by examiner

*Primary Examiner*—John Chavis
(74) *Attorney, Agent, or Firm*—Sonnenschein Nath & Rosenthal LLP

(57) ABSTRACT

Methods and systems consistent with the present invention provide a statistical profile of execution characteristics of a program, then use that statistical profile to regenerate code at run-time. When the information in the statistical profile is insufficient to make an optimization decision, methods and systems in accordance with the present invention may use the statistical profile plus additional information described below to determine a minimal level of instrumentation required to answer a particular optimization question. They then add at run-time the minimal instrumentation required to decide an optimization question, continue running the program for a period of time, and then analyze the resulting instrumentation data. These systems may either iterate the process to get more data or use the available data to compile a more highly optimized program.

3 Claims, 3 Drawing Sheets

METHOD AND SYSTEM FOR TARGETING PROFILE GATHERING THROUGH REAL-TIME DATA

RELATED APPLICATION

This application is related to U.S. patent application Ser. No. 10/840,069 filed on May 4, 2004, and entitled "Method and System for Code Optimization" and which is hereby incorporated by reference herein.

BACKGROUND

1. Field of the Invention

The present invention generally relates to data processing systems. In particular, methods and systems in accordance with the present invention generally relate to optimization of executable code.

2. Background

Computers are increasingly important in today's society, and software used to control computers is typically written in a programming language. C, C++ and other similar variations are widely used programming languages. The programming language C is described, for example, in detail in Al Kelley et al., "A Book on C," Addison-Wesley, 1997, which is incorporated herein by reference. In developing software, typically a software developer writes code, referred to as "source code," in a programming language, and the source code is compiled by a compiler into "object code" that can be run by a machine. This code is also referred to as executable code.

Although it may be easy to generate executable code that works, it may be difficult to generate executable code that operates optimally. Code that may produce correct results may do so in a manner that is inefficient, use too many system resources or take too long to execute properly. The problem of generating optimal executable code from a given source code may be generally difficult. Optimal execution may refer, for example, to obtaining peak speed, highest scalability of a parallel program, shortest time to solution, sharpest intervals in the result, smallest memory footprint, most efficient use of parallel processors, etc. Optimal execution may also refer to other performance areas.

Although the problem of optimization may be generally difficult, executable code generated directly from a specification such as a source code file, intermediate representation, or an object file can often be substantially improved by compilers, binary optimizers, and other tools that attempt to produce executable code. The process of attempting to generate code approaching an optimal solution may be referred to as optimization. Optimization is also made difficult by the absence of information required for a true optimum to be reached. Such information may include, for example, the probability with which a particular decision will be made one way or another, the frequency with which particular data will be used, the size of a particular data set and many other factors that inhibit optimization.

One solution to the problem of insufficient information, referred to as "profile feedback," is to create an executable program that contains "instrumentation" and then recompile with the results of the instrumentation. The instrumentation may be additional code that gathers some of the information useful in optimization. For example, given a decision point for which it is useful to know the probability with which particular decisions are made, one form of instrumentation is counters on all possible decisions. The instrumented program is run, data from the counters is saved, and that data may be used by a recompilation of the program to optimize the code around the decision point.

Profile feedback has numerous substantial drawbacks that prevent its widespread adoption. For example, it may be intrusive and change the character of the program that it is measuring. This means that the result of thorough instrumentation is to gather instrumentation on the instrumented program rather than on the program of interest. Another difficulty is making the choice between high instrumentation, which is intrusive and can substantially slow the program execution, or low instrumentation, wherein necessary information may not be gathered. Profile feedback may also require a second compilation phase which may be expensive on time and system resources.

Another solution for optimization is statistic analysis. In this method, the program is analyzed without benefit of any information except what is expressed in the representation of the program. Algorithms are applied to try to decide various optimization-related questions. The algorithms are often quite expensive and error-prone and often fail to decide the question. Static analysis is an ordinary process that a compiler applies to try to analyze a program. Static analysis is in contrast to dynamic analysis, which is a type of analysis that occurs at run-time and uses information generated by observing the dynamic run-time environment.

By contrast, static analysis has available the information available to the compiler at the time the program is compiled. Consider the following example:

```
   DO 20, I=1, N
   DO 10, J=1, M
     X=A(I)*B(J)/2.0
10 END DO
20 END DO
```

In this example, the static compiler can determine that it is better to multiply the 0.5 instead of divide by 2.0 because multiplication is faster than division. However, it is best to have the loop with the highest iteration count as the outer loop, and the static compiler cannot guess from analyzing this code segment whether it should accept the code as-is or interchange the nesting order of the loops.

Yet another optimization solution is directives. In this method, the information in the program is augmented with directives conveying information that may be useful in optimization. These directives are typically stored in the source code as comments. The strengths of this system are that it is a simple way of providing optimization-related information to the compilation system. However, directives have several drawbacks. For example, the directives are typically written by a human, which can be a time-consuming and error-prone process. Additionally, the directives typically provide a very small subset of the information required for best optimization. The directives are typically not portable between vendors, compilers, or over time. In practice, this means that the directives are not up-to-date for any particular target environment.

A directive may be information embedded in a comment that tells the compiler something interesting about the program. For example:

```
!$OMP PARALLEL DO
   DO 10, I=1, N
     CALL SUBR X(I))
   10 END DO
!$OMP END DO NO WAIT
```

The "!" character indicates a comment, for example, in Fortran. When this code is presented to a compiler that does not understand the directives, it treats them as comments and ignores them. When this code is presented to a compiler that does understand the directives, then it realizes that the first directive indicates that it is allowed to parallelize the loop. The second directive (END DO NO WAIT) indicates that the compiler is allowed to generate code that does not force each parallel thread to wait for the others at the end of the loop. Ordinarily, the threads would finish their work and then wait for the others before proceeding. The NOWAIT tells them to proceed without waiting.

Therefore, a need has long existed for a method and system that overcome these and related problems.

SUMMARY OF THE INVENTION

Methods and systems in accordance with the present invention optimize a program using a statistical profile. They may add at run-time instrumentation to make an optimization decision and run the program to obtain an answer from the instrumentation.

In one implementation, a method in a data processing system is provided comprising the steps of automatically analyzing an interrupt-based statistical profile of a program execution, and automatically identifying a part of the program to optimize based on the analysis.

In another implementation, a method in a data processing system is provided comprising the steps of automatically analyzing a statistical profile of a program execution, automatically attempting to optimize the program based on the analysis, and automatically optimizing the program based on information obtained during the optimization attempt.

In yet another implementation, a computer-readable medium is provided containing instructions for controlling a data processing system to perform a method. The method comprises the steps of automatically analyzing an interrupt-based statistical profile of a program execution, and automatically identifying a part of the program to optimize based on the analysis.

In one implementation, a computer-readable medium is provided containing instructions for controlling a data processing system to perform a method. The method comprises the steps of automatically analyzing a statistical profile of a program execution, automatically attempting to optimize the program based on the analysis, and automatically optimizing the program based on information obtained during the optimization attempt.

In another implementation, a data processing system is provided comprising a memory storing a first program that automatically analyzes an interrupt-based statistical profile of a second program's execution, and automatically identifying a part of the second program to optimize based on the analysis. The data processing system further comprises a processor for running the first program.

In yet another implementation, a data processing system is provided comprising a memory storing a first program that automatically analyzes an interrupt-based statistical profile of a second program's execution, and automatically identifying a part of the second program to optimize based on the analysis. The data processing system further comprises a processor for running the first program.

In accordance with methods consistent with the present invention, a method in a data processing system is provided. The method comprises analyzing a statistical profile of a program execution, identifying a part of the program to optimize based on the analysis, and regenerating the part of the program to optimize the program during run-time of the program.

In accordance with articles of manufacture consistent with the present invention, a computer-readable medium containing instructions that cause a data processing system to perform a method is provided. The method comprises the steps of analyzing a statistical profile of a program execution, identifying a part of the program to optimize based on the analysis, and regenerating the part of the program to optimize the program during run-time of the program.

In accordance with systems consistent with the present invention, a data processing system is provided that comprises a memory having a program that analyzes a statistical profile of a program execution, identifies a part of the program to optimize based on the analysis, and regenerates the part of the program to optimize the program during run-time of the program. The data processing system further comprises a processing unit that runs the program.

BRIEF DESCRIPTION OF THE DRAWINGS

The accompanying drawings, which are incorporated in and constitute a part of this specification, illustrate embodiments in accordance with methods and systems consistent with the present invention and, together with the description, serve to explain the advantages and principles consistent with the present invention.

DETAILED DESCRIPTION

Figure 1:
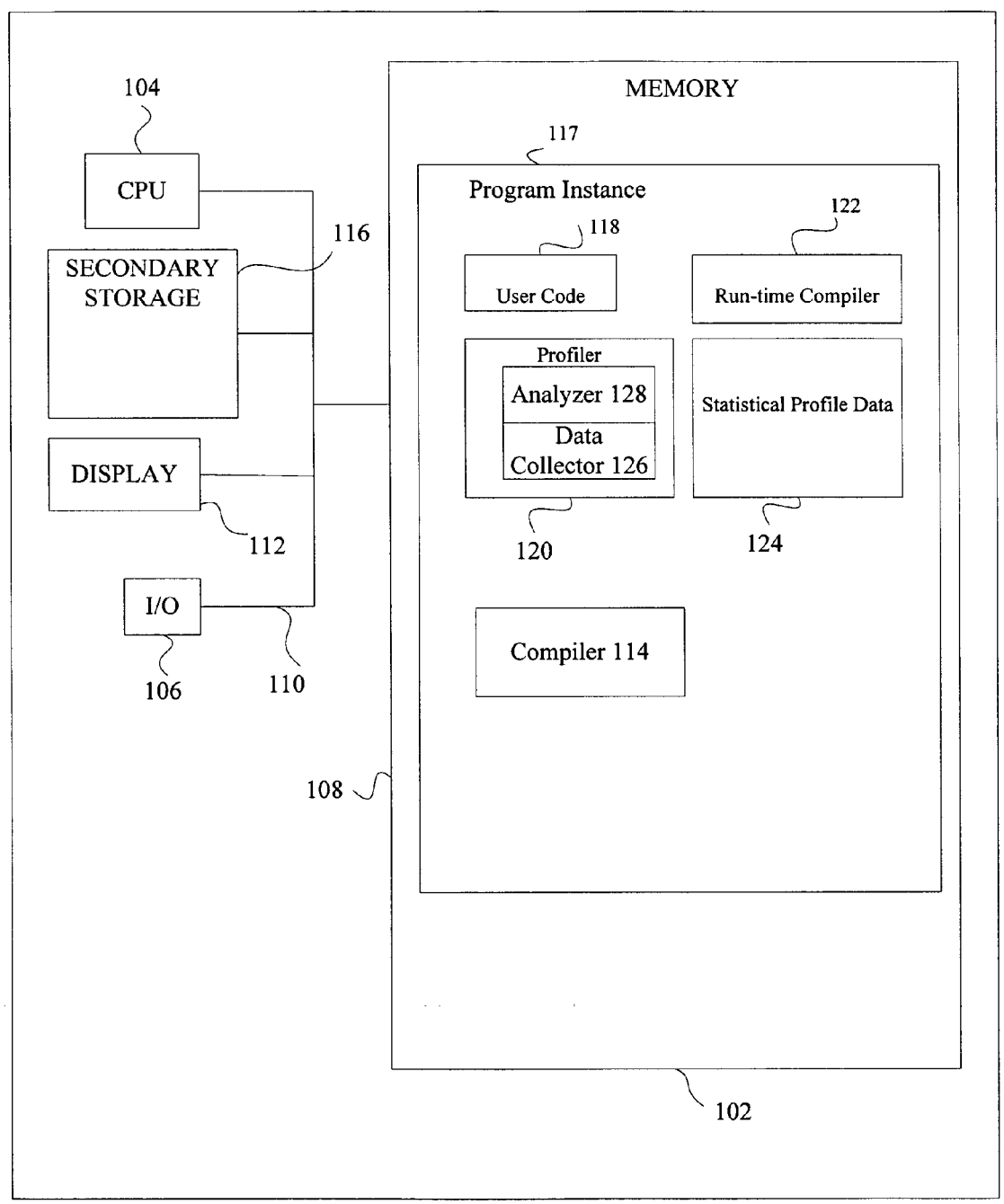
FIG. 1 depicts an exemplary data processing system suitable for use in accordance with methods and systems consistent with the present invention.

Methods and systems consistent with the present invention provide a statistical profile of execution characteristics of a program, then use that statistical profile to regenerate code at run-time. When the information in the statistical profile is insufficient to make an optimization decision, methods and systems in accordance with the present invention may use the statistical profile plus additional information described below to determine a minimal level of instrumentation required to answer a particular optimization question. They then add at run-time the minimal instrumentation required to decide an optimization question, continue running the program for a period of time, and then analyze the resulting instrumentation data. These systems may either iterate the process to get more data or use the available data to compile a more highly optimized program.

By relying primarily on a statistical profile on the target code and then leaving the instrumentation in the program for a short time, methods and systems in accordance with the present invention minimize the problems of instrumented code. By generating and regenerating code at run-time, methods and systems in accordance with the present invention avoid the problems of a separate recompilation phase. By working at run-time, methods and systems in accordance with the present invention minimize the problems of incomplete information.

To gather a statistical profile, methods and systems in accordance with the present invention cause the system to generate periodic or non-periodic interrupts throughout the execution of the program. The interrupts delivered to a particular thread of execution may or may not be correlated with the interrupts delivered to any other thread. For example, to get a view of the execution pattern of the entire system, a system could deliver periodic interrupts to every thread. However, it may be useful to try to understand the state of a subset of the system. For example, the run-time compiler may create diagnostic code to see whether a loop iteration count or cache residency assumptions are violated. It may not be desirable to keep the diagnostic code there for long because the code may become a drag on performance with frequent checks and measurements. In this case, the run-time compiler may set an interrupt for only those threads that are using the instrumented code to remind itself to check the results of its diagnostics. This interrupt does not apply to the entire system and may actually be received by only one thread. Its arrival is not correlated with signals arriving at other threads or for other reasons.

On each interrupt, the system records a snapshot of the execution state of the system. The state may be characterized by a call chain for one or more of the threads of execution, address of the currently executing instruction, address of data being read and other characteristics. The call chain at a particular point defines how execution reached that point. For example, if function F1 calls function F2 which then calls function F3 then the call chain would be F3—>F2—>F1. All or part of the snapshot may be stored for later use, and the snapshots are recorded for later analysis.

At some point during execution, a thread of execution analyzes the statistical profile and possibly additional data and uses it to attempt to further optimize the program while it is running. The additional data may include information left by the compiler that is useful to the optimizer. For example, consider the following code:
    DO 10, I=1, N
    CALL SUB1 (I)
    10 END DO If the code generator initially assumes that this loop accounts for only a small amount of execution time, then it may not inline SUB1. If dynamic analysis shows that it accounts for more execution time, it may then consider inlining SUB1. However, some subroutines are not candidates for inlining and the code generator may have to spend time at run-time determining whether SUB1 is a candidate. If the compiler has left information indicating that SUB1 can or cannot be inlined, then the code generator can save the time of computing that at run-time. This is beneficial because time spent at run-time is time included in the cost of running the program whereas time spent in compilation is relatively less expensive.

The system determines areas in which additional optimization may be applied profitably. One exemplary criterion for determining that optimization may be applied profitably is determining that a particular part of the program consumes a substantial portion of the run-time. Another exemplary criterion for determining that optimization may be applied profitably is observing that many processors are idle waiting for the results of a particular computation. Another exemplary criterion for determining that optimization may be applied profitably is determining that a particular computation runs more slowly than predicated with a model.

Once the system identifies a section of the program to be optimized, it attempts to apply additional optimization. If it is unable to decide a question relating to optimization, it recompiles that section of code with instrumentation to help it answer that particular question. It then allows the program to continue running long enough to gather sufficient data to answer the question. When it has enough data to answer the question, it again attempts to compile the code as described above. It will either discover that it needs additional information, in which case it will iterate on the process described above, or it will have what it needs and will compile a new version of the code.

The additional information previously mentioned used in addition to the statistical profile might tell the code generator what questions are most likely to yield answers that help the performance problem. The additional information may be supplied by the compiler. For example, consider the following loop:
    DO 10, I=1, N
    SUM=SUM+X(I)
10 END DO The compiler may note that it assumes that the iteration count will be high and that the X array will be resident in cache. Then if the loop runs poorly and the code generator wants to know why, it can consult the additional information, in this case the assumptions that the compiler made, to try to figure out what went wrong. In this particular case, it could generate diagnostic code to verify that the loop iteration count is actually high and that the code does not have excessive stalls loading X values. It could then come back in a few seconds to see what its diagnostic code had found. If it found that iteration counts are high but stalls waiting for X are also high, it could regenerate the loop with code that assumes that X is not cache resident. In that case, it might generate code that contains prefetch instructions to fetch data from memory in advance of when it will be used.

FIG. 1 depicts an exemplary data processing system suitable for use in accordance with methods and systems consistent with the present invention. FIG. 1 shows a computer 102 which may be connected to a network, which may be wired or wireless, and may be a LAN or WAN, and the computer may represent any kind of data processing device, such as a general-purpose data processing device, a personal computer, a plurality of interconnected data processing devices, video game console, clustered server, a mobile computing device, a personal data organizer, a mobile communication device including mobile telephone or similar devices. The computer 102 may represent a computer in a distributed environment, such as on the Internet. There may also be more computers 102 than shown on the figure.

A computer 102 may include a central processing unit ("CPU") 104, an input-output ("I/O") unit 106 such as a mouse or keyboard, or a graphical input device such as a writing tablet, and a memory 108 such as a random access memory ("RAM") or other dynamic storage device for storing information and instructions to be executed by the CPU. The computer 102 also includes a secondary storage device 116 such as a magnetic disk or optical disk that may communicate with each other via a bus 100 or other communication mechanism. The computer 102 may also include a display 112 such as a cathode ray tube ("CRT") or LCD monitor, and an audio/video input (not shown) such as a webcam and/or microphone.

Although aspects of methods and systems consistent with the present invention are described as being stored in memory 108, one having skill in the art will appreciate all or part of methods and systems consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system are described, one skilled in the art will appreciate that a data processing system suitable for use with methods, systems, and articles of manufacture consistent with the present invention may contain additional or different components. The computer 102 may include a human user or may include a user agent. The term "user" may refer to a human user, software, hardware or any other entity using the system.

As shown, the memory 108 in the computer 102 may include a program instance 117 having user code 118 and a static compiler 114 which compiles code from a human-readable form (e.g., C, Fortran) into a machine-readable form. This form may be object code or executable code suitable for execution, byte code suitable for interpretation (e.g., Java), or an abstract representation intended for later transformation by other components in the system (e.g., the run-time compiler described below).

The run-time compiler 122 generates executable code based on the results of static compilation, analysis of various execution profiles, and consideration of environmental details such as number of CPUs, system load, and amount of available memory. The run-time compiler 122 takes the output from the static compiler 114 plus possibly other information such as the profile data and may recompile all, some, or none of the code. In one implementation, the run-time compiler 122 compiles all of the code if the static compiler 114 produces only an intermediate form that cannot be executed. This may happen, for example, in delayed binding systems in which the executable file is expected to run on many different systems such as an Intel x86 and a Sun SPARC. In this case, the instruction generation cannot take place until the executable sees the target machines. The run-time compiler 122 may compile some of the code if the static compiler 114 produces code that does not run fast. In one implementation, the run-time compiler 122 may compile none of the code if the static compiler 114 produces code that runs fast enough. For example, if a particular run of a program has a short run-time, then the run-time compiler 122 may not be invoked during that particular run.

The run-time compiler 122 may detect a problem at run-time and then generate code to determine what the problem is. For example, consider the following exemplary code:

```
DO 10, I=1, N
   X(I)=526*X (I)
10 END DO
```

The run-time compiler 122 may make various assumptions about the loop and then generate code based on those. For example, if it assumes that the iteration count (N) is very large, then it may create code that takes a while to start up but that runs very fast once it gets going. Techniques used in such a loop may include prefetching data from memory and unrolling the loop.

If it turns out that the loop iteration count is actually very small, e.g., 3, then the prefetching and unrolling will not help, and the overhead of setting them up will make the loop run more slowly. If the run-time compiler 122 notices the loop above running slowly, it may consider two possibilities: (1) the unrolling or prefetching are not being done well, and (2) the iteration count is much smaller than it assumed and it should not unroll or prefetch. In response, the run-time compiler 122 could generate exemplary code such as the following:

```
NITER=NITER+N
NLOOP=NLOOP+1
STALL_CYCLES=GET STALL_CYCLES ( )
DO 10, I=1, N
   X (I)=526*X(I)
10 END DO
TOTAL_STALL=
   $ TOTAL_STALL+(GET_STALL_CYCLES( )-START_
STALL_CYCLES)
```

Then it could let the code run for a while longer and then perform further analysis. As a result, it may apply the following considerations. If the average iteration count computed with NITER/NLOOP is smaller than an expected value or threshold then that indicates that the loop should be compiled without the high-overhead techniques that improve long loops and should be recompiled with low-overhead techniques that help short loops. If the amount of time stalled on memory indicated by TOTAL_STALL is higher than an expected value or threshold then that indicates that the loop has a higher-than-expected dependence on the time to fetch operands from memory. In this case, it may recompile the loop with more aggressive prefetching if possible, or otherwise leave it alone. If neither are applicable then the source of the problem may be unknown, in which case it may remove the instrumentation code and attempt a different compilation strategy.

The profiler 120 comprises a data collector 126 and an analyzer 128. The data collector 126 collects statistical and event-driven run-time information and stores it as statistical profile data 124. It collects the event-driven information by establishing instrumentation points to count the number of times that certain events occur and/or how much time they take. For example, it may set such a point in a subroutine that attempts to lock a mutual exclusion lock and then count how many times the lock was already locked by another entity. It may also record how much time it spent waiting for the lock when it was held by another entity. The data collector 126 may collect statistical run-time information by establishing counters that generate interrupts when they count down to zero or when they overflow. A common example of this is a count-down timer but other examples include counters that count the number of cycles spent waiting for an event such as satisfaction of a memory request. When the interrupt is generated, a part of the data collector 126 catches the interrupt indication and takes a snapshot of part of the system state. The state is then recorded, the counter is reset, and control is returned to the code that was interrupted.

Periodically, or in response to specific stimuli such as a function call, an analyzer 128 runs that analyzes the statistical profile data 124 and determines where the points of interest are and what can be done. It invokes various systems components such as the run-time compiler 122 to try to eliminate or mitigate the points of interest where possible.

Although only one compiler 114 is shown, any number of compilers 114 or other components may be used. Additionally, although shown on the computer 102 in the memory 108, these components may reside elsewhere, such as in the secondary storage 116, or on another computer, such as another computer 102. Furthermore, these components may be hardware or software whereas embodiments in accordance with the present invention are not limited to any specific combination of hardware and/or software. The system may be implemented in any way, in software or hardware or a combination thereof, and may be distributed among many computers. It may represented by any number of components, processes, threads, etc.

Computers 102 may communicate directly or over networks, and may communicate via wired and/or wireless connections, including peer-to-peer wireless networks, or any other method of communication. Communication may be done through any communication protocol, including known and yet to be developed communication protocols. The network may comprise many more computers 102 and than those shown on the figure, and the computers may also have additional or different components than those shown.

It will be appreciated that various modifications to detail may be made to the embodiments as described herein. Further, it is noted that a computer-readable medium may be provided having a program embodied thereon, where the program is to make a computer or system of data processing devices execute functions or operations of the features and elements of the above described examples. A computer-readable medium may include a magnetic or optical or other tangible medium on which a program is embodied, but can also be a signal, (e.g., analog or digital), electromagnetic or optical, in which the program is embodied for transmission. Further, a computer program product may be provided comprising the computer-readable medium.

Figure 2:
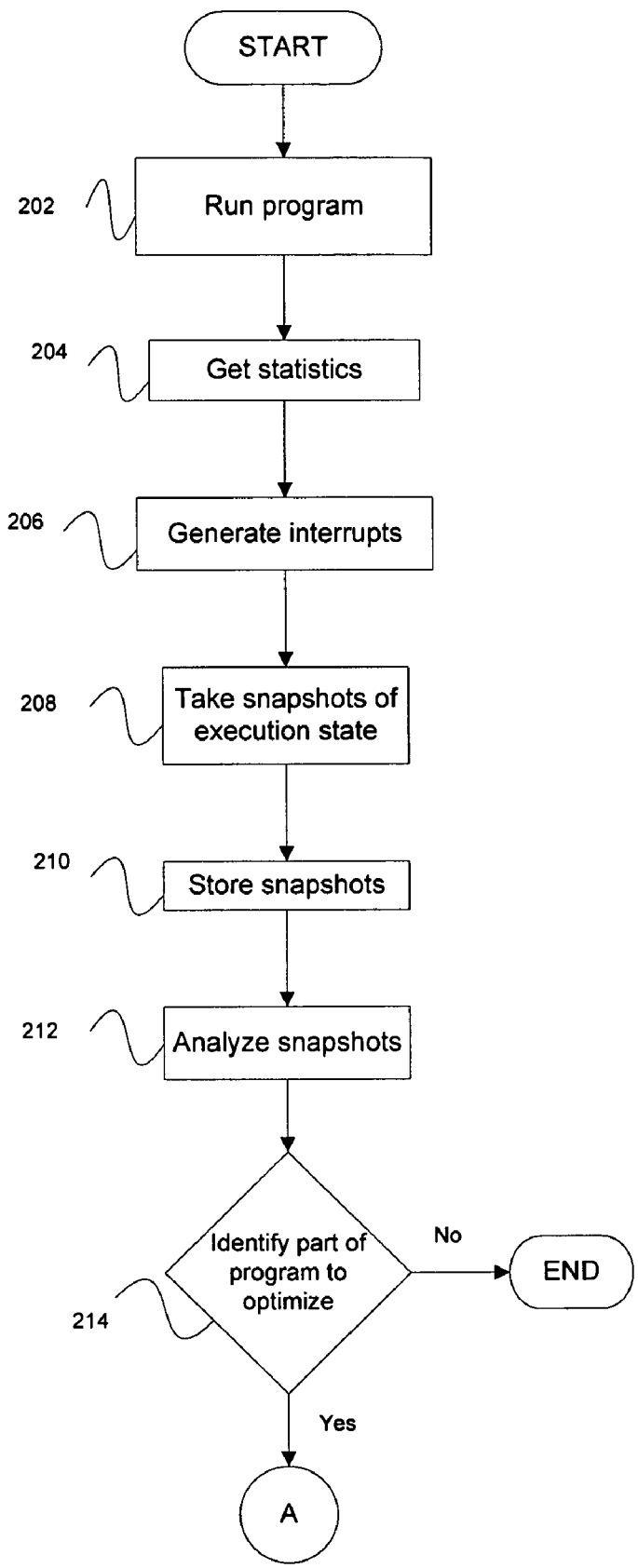
FIG. 2 depicts steps in the method for gathering a statistical profile in accordance with methods and systems consistent with the present invention.

FIG. 2 depicts steps in the method for gathering a statistical profile in accordance with methods and systems consistent with the present invention. In one implementation, these steps are performed automatically at run-time. First, the program or user code 118 to be analyzed is run (step 202) and then statistics are gathered (step 204) by the data collector 126 by generating interrupts throughout the program (step 206). At each of the interrupts in the program, a snapshot of the execution state of the program is taken (step 208) and stored in the statistical profile data base 124 for later analysis (step 210). The analyzer 128 analyzes these snapshots (step 212), and through this analysis attempts to identify part of the program to optimize. If there is no part of the program to optimize (step 214), the program needs no further manipulation.

Figure 3:
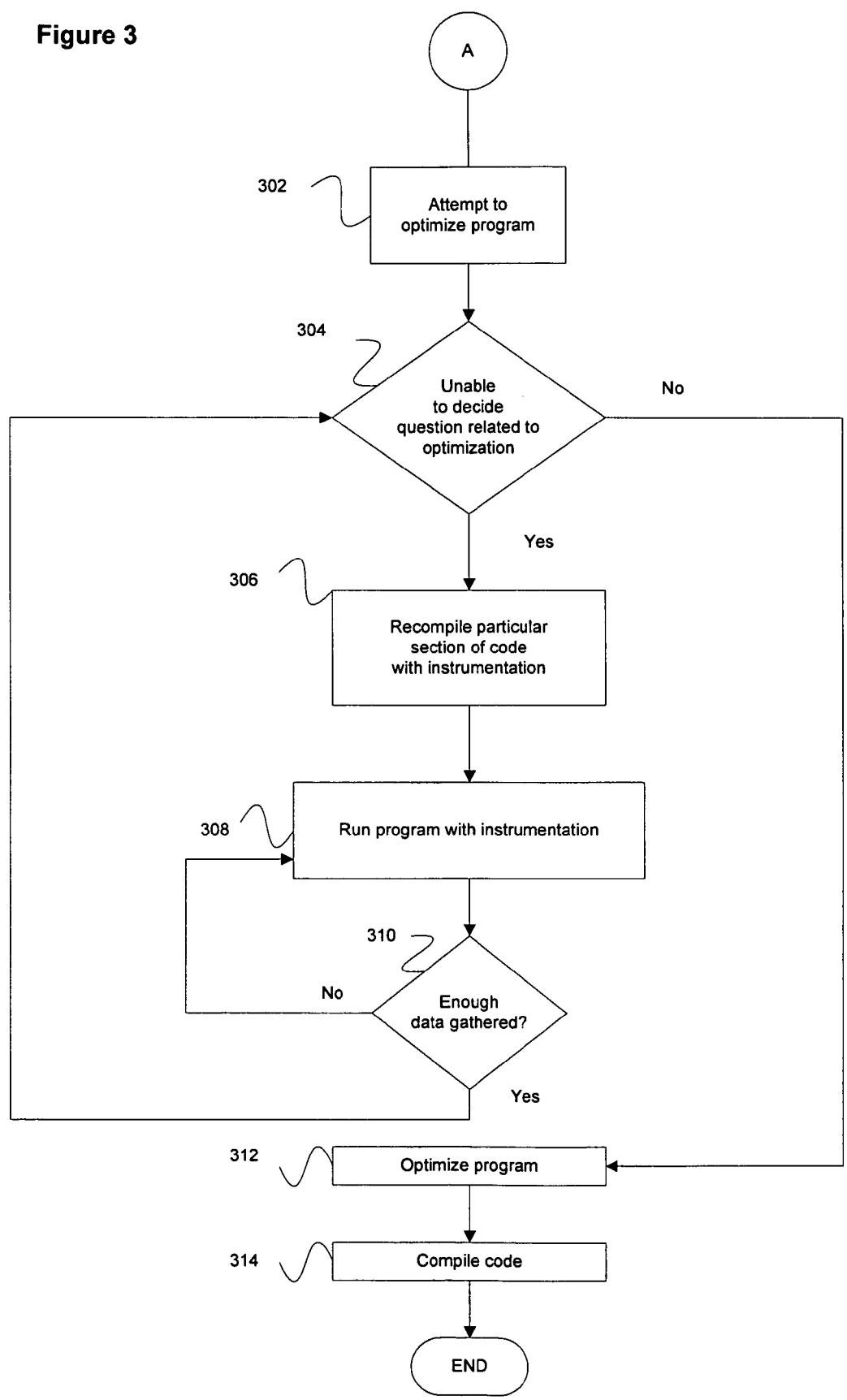
FIG. 3 depicts steps in an exemplary method for optimizing a program in accordance with methods and systems consistent with the present invention.

FIG. 3 depicts steps in an exemplary method for optimizing a program in accordance with methods and systems consistent with the present invention. In one implementation, these steps are performed automatically at run-time. The run-time compiler 122 attempts to optimize the program (step 302). It determines if it can decide possibly important questions related to optimization, and if it is unable to decide a question related to optimization (step 304), the run-time compiler 122 recompiles the particular section of code in question with instrumentation (step 306). In one implementation, if the analyzer 128 is able to decide questions related to optimization, the system proceeds to optimize the program (step 312). If there is an undecided question related to optimization and the system has recompiled the particular section of code with instrumentation, it may then run the program long enough to gather sufficient data to decide the question related to optimization (steps 308 and 310). (In one implementation, steps 202-212 may be reiterated for this process). If enough data is gathered (step 310), the run-time compiler 122 may then optimize the program (step 312) and compile the code (step 314). If enough data was not gathered, the system may reiterate the process by having the run-time compiler 122 recompile the particular section of code with further instrumentation and/or running the program long enough to gather sufficient data (step 304).

During compilation, any standard compiler techniques may be used including, but not limited to: (1) optimizing branch generation (using the statistical data to infer branch probability instead of requiring user directives or exact branch counts as gathered by instrumented code), (2) creation of clones based on the cases that arise in frequent call chains, and (3) applying inlining and outlining using the statistical data to infer frequency information instead of requiring user directives or exact frequency information from instrumented code.

The following example shows the operation of an exemplary implementation in accordance with methods and systems consistent with the present invention.

```
subroutine sub1(n, ab)
integer n
real ab(n)
do 10, i=1, n
ab(i)=sqrt(ab(i))
10 continue
end subroutine sub1
```

In this case, the compiler cannot decide whether to use a prefetch instruction to start the process of fetching ab from memory before it is needed. If ab is a large array and it is not in cache, then the prefetch will be profitable. If ab is in the cache, then the prefetch will cause performance degradation by increasing the number of memory instructions issued without getting any corresponding benefit. To decide the question, it recompiles with instrumentation that measures cache misses and lets the instrumented code run for a while.

After enough data has accumulated, it analyzes the data to decide the prefetch question. If references to ab usually miss cache, then it will recompile with a prefetch. If they usually do not miss cache, then it will recompile without a prefetch. If they sometimes do and sometimes do not, then it may use a best judgment or it may recompile with more instrumentation to attempt to figure out the cases in which cache misses occur. For example, it may examine the call chains to see if certain calls tend to result in cache misses whereas others do not.

As an example of a question that may not be decided by the compiler, suppose there is the following code:

```
READ*, N
DO 10, I=1, N
```

The compiler may not be able to decide if the loop iteration count on the 10 loop will be high or low. In particular, it may not be able to decide if it will be high enough to justify unrolling or parallelization.

In the following example, the compiler may not be able to decide how likely is it that the following branch will be taken and the assignment executed. If it is relatively high, then 1/Q should probably be precomputed. If it is relatively low, then 1/Q should not be precomputed:

```
IF (A.LT.B) THEN
Q=1/Q
END IF
SUM=SUM+Q
```

In the following example, if the compiler does not have the source to SUB1 at the time that it compiles it, then it does not know whether SUB1 manipulates MYFILE.

```
OPEN(526,FILE="MYFILE")
READ(526,*)AB
CALL SUB1
READ(526,*)CD
```

If SUB1 does not affect MYFILE, then the compiler could merge the reads from AB and CD, which can often save time. However, if SUB1 does affect MYFILE, such as reading a value from it, then moving the READ into CD above the call to SUB1 can give wrong answers.

In the following example, if N is large then AB will also be large and operations on AB should assume that it will not fit in cache. If N is small, AB usually does fit into cache and code should be generated accordingly:

```
READ*,N
ALLOCATED(X(N))
```

The foregoing description of an implementation of the invention has been presented for purposes of illustration and description. It is not exhaustive and does not limit the invention to the precise form disclosed. Modifications and variations are possible in light of the above teachings or may be acquired from practice. For example, the described implementation includes software but the present invention may be implemented as a combination of hardware and software or in hardware alone. Note also that the implementation may vary between systems. The invention may be implemented with both object-oriented and non-object-oriented programming systems.

What is claimed is:

1. A method in a data processing system comprising the automated steps of:
   obtaining statistics regarding a program during runtime;
   analyzing the statistics;
   identifying a part of the program to optimize based on the analysis;
   determining an optimization question related to the identified part of the program;
   recompiling the identified part of the program with instrumentation to determine an answer to the optimization question;
   running the program with the instrumentation to obtain the answer to the question;
   determining whether an answer to the question can be obtained from running the program with the instrumentation;
   when an answer to the question can be obtained, determining the answer to the optimization question based on results from the instrumentation;
   when an answer to the question cannot be obtained, recompiling the program with additional instrumentation; and
   optimizing the program based on the answer to the optimization question.

2. A tangible computer-readable medium containing instructions for controlling a data processing system to perform a method, the method comprising the automated steps of:
   obtaining statistics regarding a program during runtime;
   analyzing the statistics;
   identifying a part of the program to optimize based on the analysis;
   determining an optimization question related to the identified part of the program;
   recompiling the identified part of the program with instrumentation to determine an answer to the optimization question;
   running the program with the instrumentation to obtain the answer to the question;
   determining whether an answer to the question can be obtained from running the program with the instrumentation;
   when an answer to the question can be obtained, determining the answer to the optimization question based on results from the instrumentation;
   when an answer to the question cannot be obtained recompiling the program with additional instrumentation: and
   optimizing the program based on the answer to the optimization question.

3. A data processing system, comprising:
   a memory storing a first program that automatically obtains statistics regarding a second program during runtime, analyzes the statistics, identifies a part of the second program to optimize based on the analysis, determines an optimization question related to the identified part of the second program, recompiles the identified part of the second program with instrumentation to determine an answer to the optimization question, runs the second program with the instrumentation to obtain the answer to the question, determines whether an answer to the question can be obtained from running the program with the instrumentation, when an answer to the question can be obtained, determines the answer to the optimization question based on results from the instrumentation, when an answer to the question cannot be obtained, recompiling the program with additional instrumentation, and optimizes the second program based on the answer to the optimization question; and
   a processor for running the first program.

* * * * *